(12) United States Patent
Parrinello et al.

(10) Patent No.: US 10,471,645 B2
(45) Date of Patent: Nov. 12, 2019

(54) APPARATUS FOR BLOW-MOLDING PLASTIC CONTAINERS

(71) Applicant: SACMI IMOLA S.C., Imola (IT)

(72) Inventors: Fiorenzo Parrinello, Medicina (IT); Alessandro Rosso, Pieve di Soligo (IT)

(73) Assignee: SACMI IMOLA S.C., Imola (IT)

( * ) Notice: Subject to any disclaimer, the term of this patent is extended or adjusted under 35 U.S.C. 154(b) by 0 days.

(21) Appl. No.: 16/078,616

(22) PCT Filed: Feb. 23, 2017

(86) PCT No.: PCT/EP2017/054235
§ 371 (c)(1),
(2) Date: Aug. 21, 2018

(87) PCT Pub. No.: WO2017/144615
PCT Pub. Date: Aug. 31, 2017

(65) Prior Publication Data
US 2019/0047205 A1 Feb. 14, 2019

(30) Foreign Application Priority Data
Feb. 24, 2016 (IT) .......................... 102016000018800

(51) Int. Cl.
*B29C 49/62* (2006.01)
*B29C 49/48* (2006.01)
(Continued)

(52) U.S. Cl.
CPC .............. *B29C 49/62* (2013.01); *B29C 49/30* (2013.01); *B29C 49/48* (2013.01); *B29C 49/06* (2013.01);
(Continued)

(58) Field of Classification Search
CPC ........................ B29C 49/62; B29C 2049/4892
See application file for complete search history.

(56) References Cited

FOREIGN PATENT DOCUMENTS

DE 102013226906 A1 7/2015
FR 2947755 A1 1/2011
(Continued)

OTHER PUBLICATIONS

International Search Report dated May 8, 2017 re: Application No. PCT/EP2017/054235, pp. 1-3.
(Continued)

*Primary Examiner* — Robert B Davis
(74) *Attorney, Agent, or Firm* — Cantor Colburn LLP

(57) ABSTRACT

An apparatus for blow-molding plastic containers includes at least one blow-molding station that defines at least one molding cavity for forming plastic containers. The blow-molding station includes two lateral bodies and, for each forming cavity defined by the blow-molding station, a bottom. The bottom includes an external body of the bottom that defines an annular portion that extends around the axis of extension of the respective forming cavity, and an internal body that can be accommodated at least partially inside the annular portion, between the external lateral surface of the internal body and the internal surface of the annular portion there being at least one air evacuation opening that extends around the axis of extension and is connected to first air evacuation elements. The internal body is adjustably movable on command with respect to the annular portion along the axis of extension.

10 Claims, 2 Drawing Sheets

(51) Int. Cl.
*B29C 49/30* (2006.01)
*B29L 31/00* (2006.01)
*B29C 49/06* (2006.01)

(52) U.S. Cl.
CPC . *B29C 2049/4892* (2013.01); *B29L 2031/712* (2013.01); *B29L 2031/7158* (2013.01)

(56) References Cited

FOREIGN PATENT DOCUMENTS

| JP | 04347622 A | * 12/1992 | ............ B29C 49/62 |
| JP | 06270235 A | * 9/1994 | ............ B29C 49/48 |
| JP | 07323471 A | * 12/1995 | ............ B29C 49/62 |
| JP | H08142173 A | 6/1996 | |
| JP | 2008024314 A | 2/2008 | |

OTHER PUBLICATIONS

Written Opinion dated May 8, 2017 re: Application No. PCT/EP2017/054235, pp. 1-4.

* cited by examiner

APPARATUS FOR BLOW-MOLDING PLASTIC CONTAINERS

TECHNICAL FIELD

The present disclosure relates to an apparatus for blow-molding plastic containers.

BACKGROUND

Typically, such apparatuses for blow-molding plastic containers comprise blow-molding stations that define one or more molding cavities for forming the containers.

In particular, the blow-molding stations comprise two lateral bodies, and a respective bottom for each forming cavity defined by the blow-molding station.

At least one of the lateral bodies is movable on command by way of cyclic opening and closing means, as is the bottom, so as to allow the transition of the forming station from an open condition, in which the preform or preforms can be fed in and the blow-molded container can be ejected, and a closed condition, in which the blow-molding of the preform is carried out in order to obtain the container.

During blow-molding operations, it is necessary to evacuate the air from the mold, as this air hampers the correct forming of the container.

Such evacuation is usually achieved by providing air evacuation ducts that lead into the mold.

Such solution, while conceptually valid, has some drawbacks.

In particular, the efficacy and speed of evacuation of the air is proportional to the so called total vent cross-section area, which corresponds to the sum of the areas of the holes of the evacuation ducts.

For this reason it would be preferable to have a high number of evacuation ducts but, for reasons of construction, it is not always possible to position them where they are needed without blocking the cooling circuit.

In order to increase the total vent cross-section area without compromising the quality of the molding, a solution has been proposed, in French patent application no. FR2947755 in the name of Comep, which entails providing the bottom in two parts.

In particular, the two parts comprise an annular external body that defines a plurality of recesses extending in a radial direction and mutually angularly spaced apart, and an internal body that has a plurality of complementarily-shaped raised portions designed to engage in corresponding recesses.

The internal body is therefore locked with respect to the external body, so that between the two bodies an annular evacuation opening is provided that extends around the axis of the bottom and which is connected to one or more air evacuation ducts.

Such solution, while conceptually valid, has some drawbacks, however.

First of all, it should be noted that in the design phase, the corresponding optimal positioning between the internal body and the external body needs to be studied as a function of the shape of the container to be molded.

This makes the use of the solution described rather inflexible, since the bottom furthermore needs to be redesigned if it is necessary to reduce or increase, even slightly, the internal volume of the container to be obtained.

SUMMARY

The aim of the present disclosure is to solve the above mentioned problems and overcome the drawbacks, by providing an apparatus for blow-molding plastic containers that is considerably easier and more practical to use.

Within this aim, the disclosure provides an apparatus for blow-molding plastic containers that makes it possible to evacuate the air during blow-molding operations extremely effectively.

The present disclosure also provides an apparatus for blow-molding plastic containers that makes it possible to reduce or increase the internal volume of the container to be obtained without redesigning or replacing the bottom.

This aim and these and other advantages which will become better apparent hereinafter are achieved by providing an apparatus for blow-molding plastic containers according to claim 1.

BRIEF DESCRIPTION OF THE DRAWINGS

Further characteristics and advantages of the disclosure will become better apparent from the description of some preferred, but not exclusive, embodiments of an apparatus for blow-molding plastic containers according to the disclosure, which are illustrated by way of non-limiting example in the accompanying drawings wherein.

DETAILED DESCRIPTION OF THE DRAWINGS

In the embodiments illustrated below, individual characteristics shown in relation to specific examples may in reality be interchanged with other, different characteristics, existing in other embodiments.

Figure 1:
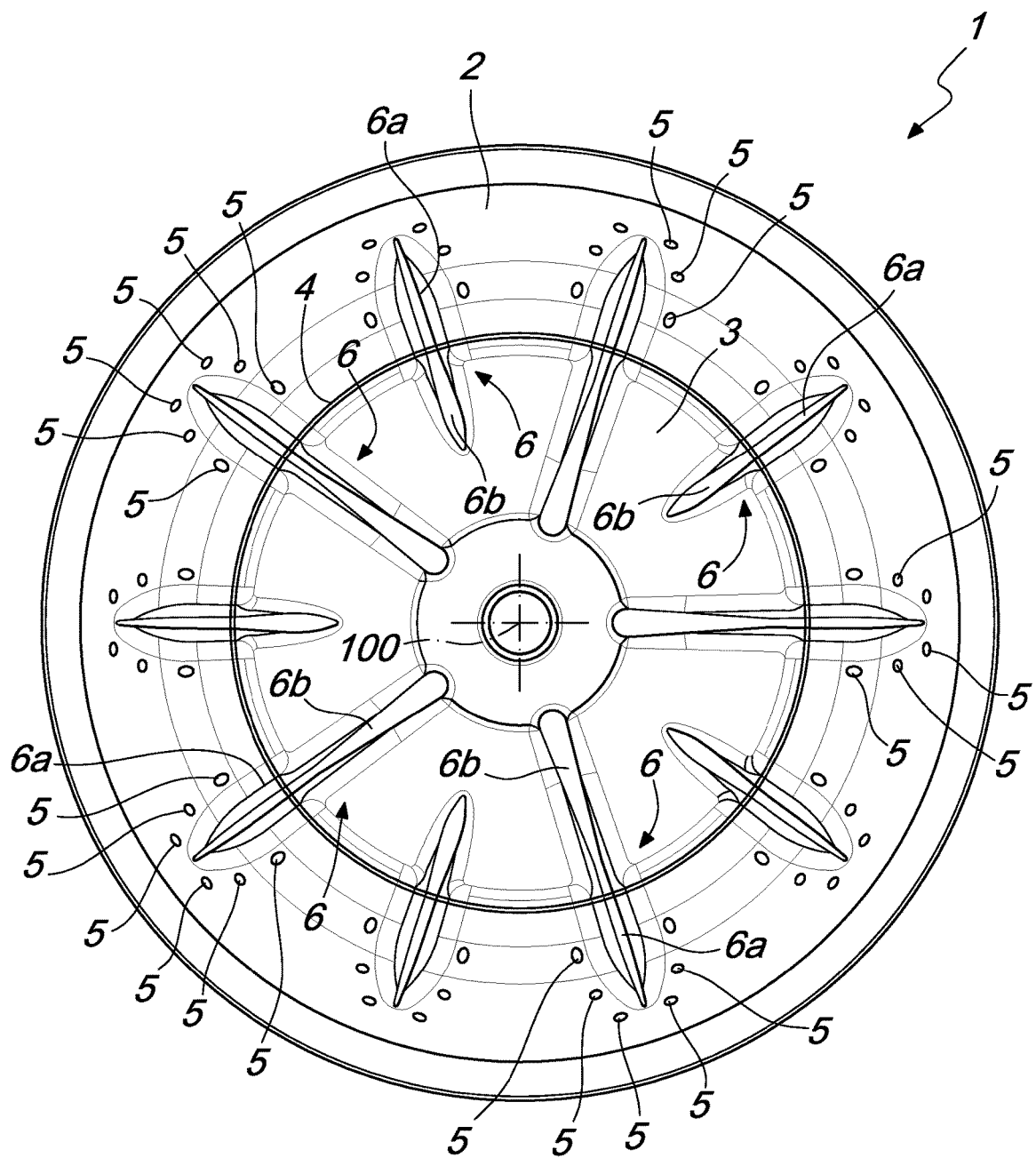
FIG. 1 is a view from above of a bottom according to the disclosure.
Figure 2:
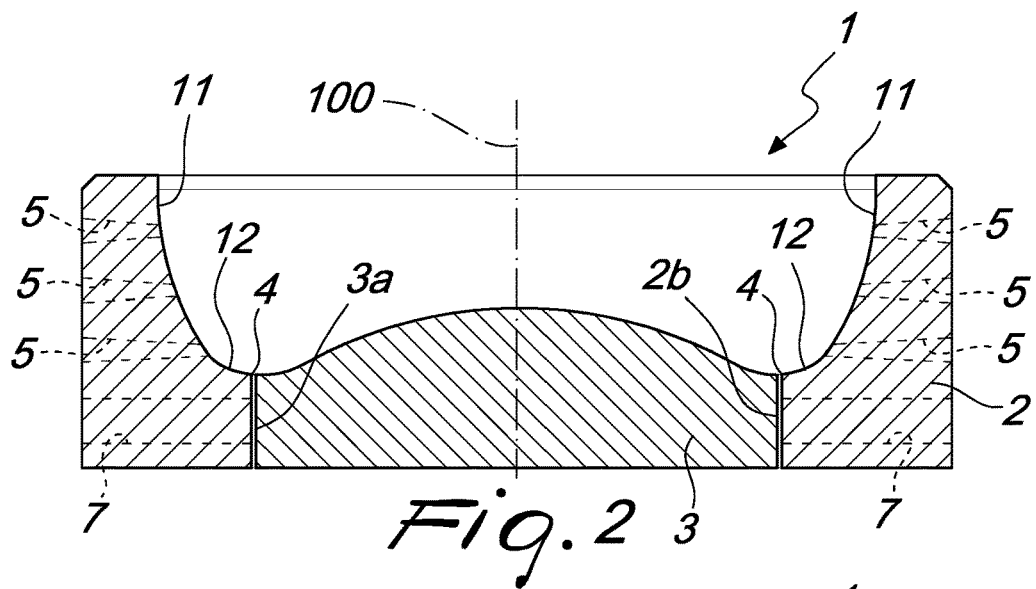
FIGS. 2 to 4 are cross-sectional views of a bottom according to the disclosure, in which the central body is arranged with respect to the external body in three different positions.
Figure 3:
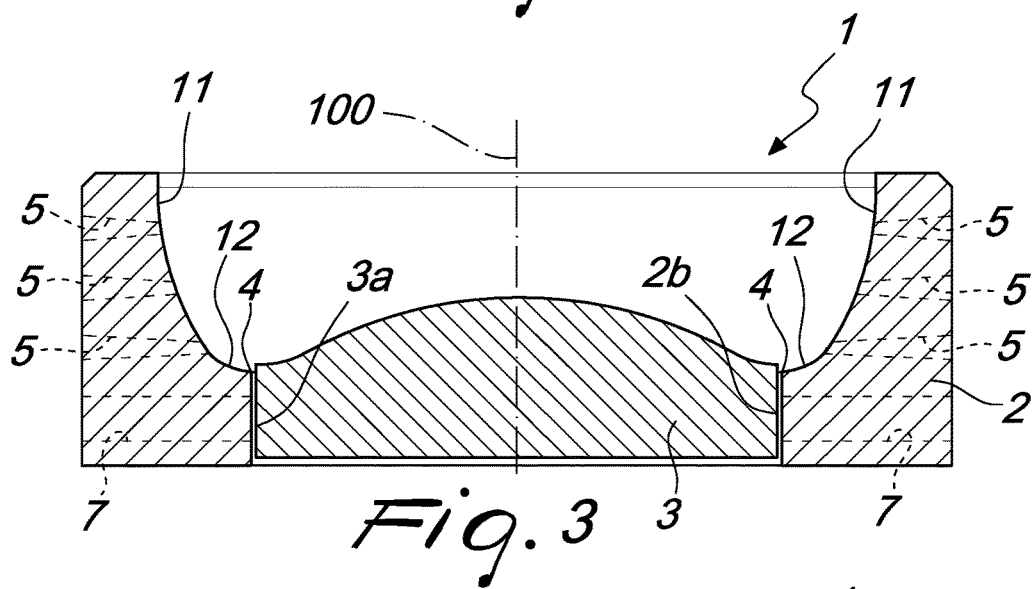
Figure 4:
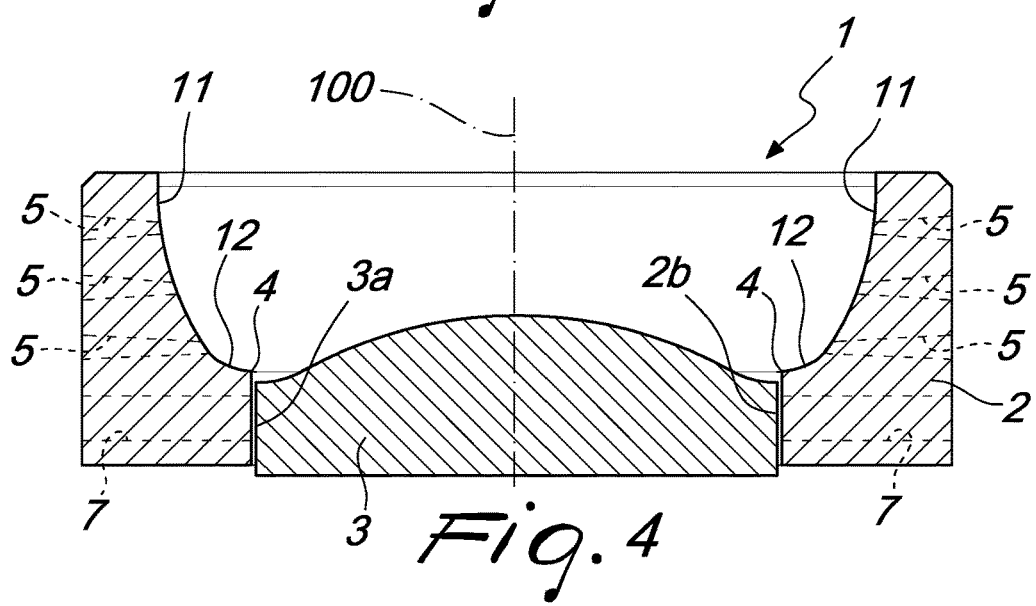

With reference to FIGS. 1-4, the present disclosure relates to an apparatus for blow-molding plastic containers.

The apparatus comprises at least one blow-molding station, which defines at least one molding cavity for forming plastic containers.

The blow-molding station comprises two lateral bodies and, for each forming cavity defined by the blow-molding station, a bottom 1.

Conveniently, at least one of the lateral bodies is movable on command by way of cyclic opening and closing means, as is the bottom, so as to allow the transition of the forming station from an open condition, in which the preform or preforms can be fed in and the blow-molded container can be ejected, and a closed condition, in which the blow-molding is carried out of the preform in order to obtain the container.

According to the present disclosure, the bottom 1 comprises an external body 2 of the bottom that defines an annular portion that extends about the axis of extension 100 of the respective forming cavity, and an internal body 3.

The internal body 3 can be accommodated at least partially inside the annular portion.

Between the external lateral surface 3a of the internal body 3 and the internal surface 2b of the annular portion there is at least one air evacuation opening 4, which extends around the axis of extension 100 and is connected to first air evacuation means.

Furthermore, the internal body 3 is adjustably movable on command with respect to the annular portion along the axis of extension 100.

The presence of the evacuation opening 4 makes it possible to appreciably increase the total vent surface, thus appreciably reducing the pressure necessary for the molding.

The possibility to adjust the position of the internal body 3 with respect to the external body 2 further makes it possible to adjust the volume of the cavity (and therefore of the container) and optionally also the total vent surface.

Preferably, the evacuation opening 4 has a continuous extension in a closed loop that extends around the axis of extension 100.

Conveniently, the internal surface 2b of the annular portion has a substantially cylindrical extension.

Advantageously, the first air evacuation means comprise a plurality of first evacuation channels 7, which exit at the internal surface 2b of the annular portion.

The first evacuation channels 7 extend substantially radially with respect to the axis of extension 100 and are mutually angularly spaced apart.

Conveniently, the external body 2 defines a lateral region 11 of the containment cavity and a bottom region 12 of the cavity, which is arranged contiguously with the lateral region 11.

Preferably, the bottom 1 is associated with a maneuvering body for adjusting the position of the internal body 3 with respect to the annular portion along the axis of extension 100.

Conveniently, the bottom 1 defines a plurality of radial ridges 6 that are adapted to make it possible to obtain a petaloid shape of the bottom of the container.

The radial ridges 6 comprise, respectively, a first ridge portion 6a defined on the external body 2, and a second ridge portion 6b defined on the internal body 3.

Preferably, the bottom 1 defines second air evacuation channels 5.

With reference to the embodiment shown in the figures, the second air evacuation channels 5 are defined on the external body 2 and lead proximate to the edges of the first ridge portions 6a.

In practice it has been found that in all the embodiments the disclosure is capable of fully achieving the set aims and advantages.

The disclosure, thus conceived, is susceptible of numerous modifications and variations.

In practice the materials employed, provided they are compatible with the specific use, and the dimensions and shapes, may be any according to requirements.

Moreover, all the details may be substituted by other, technically equivalent elements.

The disclosures in Italian Patent Application No. 102016000018800 (UB2016A001012) from which this application claims priority are incorporated herein by reference.

The invention claimed is:

1. An apparatus for blow-molding plastic containers, the apparatus comprises at least one blow-molding station that defines at least one molding cavity for forming plastic containers, said blow-molding station comprising two lateral bodies and, for each forming cavity defined by said blow-molding station, a bottom, wherein said bottom comprises an external body of the bottom that defines an annular portion that extends around the axis of extension of the respective molding cavity, and an internal body that can be accommodated at least partially inside said annular portion, between the external lateral surface of said internal body and an internal surface of said annular portion there being at least one air evacuation opening that extends around said axis of extension and is connected to first air evacuation means, said internal body being adjustably movable on command with respect to said annular portion along said axis of extension.

2. The apparatus for blow-molding plastic containers according to claim 1, wherein said evacuation opening has a continuous extension in a closed loop that extends around said axis of extension.

3. The apparatus for blow-molding plastic containers according to claim 1, wherein the internal surface of said annular portion has a substantially cylindrical extension, said first air evacuation means comprising a plurality of first evacuation channels that exit at the internal surface of said annular portion.

4. The apparatus for blow-molding plastic containers according to claim 3, wherein said first evacuation channels extend substantially radially with respect to said axis of extension and are mutually angularly spaced apart.

5. The apparatus for blow-molding plastic containers according to claim 1, wherein said external body defines a lateral region of said at least one molding cavity and a bottom region of said at least one molding cavity that is arranged contiguously with said lateral region.

6. The apparatus for blow-molding plastic containers according to claim 1, further comprising a maneuvering body for adjusting a position of said internal body with respect to said annular portion along said axis of extension.

7. The apparatus for blow-molding plastic containers according to claim 1, wherein said bottom defines a plurality of radial ridges.

8. The apparatus for blow-molding plastic containers according to claim 7, wherein said radial ridges comprise respectively a first ridge portion defined on said external body and a second ridge portion defined on said internal body.

9. The apparatus for blow-molding plastic containers according to claim 1, wherein said bottom defines second air evacuation channels.

10. The apparatus for blow-molding plastic containers according to claim 9, wherein said second air evacuation channels are defined on said external body and exit proximate to edges of said first ridge portions.

* * * * *